(12) United States Patent
Chien

(10) Patent No.: US 8,083,376 B2
(45) Date of Patent: Dec. 27, 2011

(54) LED POWER FAILURE LIGHT

(76) Inventor: Tseng-Lu Chien, Walnut, CA (US)

( * ) Notice: Subject to any disclaimer, the term of this patent is extended or adjusted under 35 U.S.C. 154(b) by 0 days.

(21) Appl. No.: 12/711,456

(22) Filed: Feb. 24, 2010

(65) Prior Publication Data

US 2010/0213849 A1    Aug. 26, 2010

(51) Int. Cl.
*F21V 1/10* (2006.01)

(52) U.S. Cl. ........ 362/276; 362/640; 362/641; 362/642; 362/644

(58) Field of Classification Search .................. 362/276, 362/640, 641, 642, 644, 646, 249.02, 249.05; 315/312, 349
See application file for complete search history.

(56) References Cited

U.S. PATENT DOCUMENTS

| | | | |
|---|---|---|---|
| 6,648,496 B1 * | 11/2003 | Elghoroury et al. | 362/555 |
| 7,036,948 B1 * | 5/2006 | Wyatt | 362/95 |
| 7,045,975 B2 * | 5/2006 | Evans | 315/312 |
| 7,080,921 B2 * | 7/2006 | Feldstein | 362/219 |
| 7,165,876 B2 * | 1/2007 | Dickie | 362/642 |
| 7,476,002 B2 * | 1/2009 | Wolf et al. | 362/231 |
| 7,722,230 B2 * | 5/2010 | Chien | 362/382 |

* cited by examiner

*Primary Examiner* — Anabel Ton

(74) *Attorney, Agent, or Firm* — Bacon & Thomas, PLLC

(57) ABSTRACT

An LED power failure light device has first LED element(s) powered by a power source to serve as a night light and second LED element(s) powered by non-rechargeable batteries to serve as an emergency light, which may incorporate a multiple selection switch to change the numbers, power consumption, blinking, on/off duration percentage of each blinking cycle, colors of the night light, LED sequences, and other extra functions. The power source for the first LED elements may be supplied through prongs inserted into an electrical outlet or through a USB adapter. The LED power failure light device may further including various additional power and cost saving features.

15 Claims, 5 Drawing Sheets

LED POWER FAILURE LIGHT

This application is related to U.S. patent application Ser. Nos. 12/624,621, 12/622,100, 12/318,471, 12/318,470, 12/318,473, 12/292,153, 12/232,505, 12/232,035, 12/149,963, 12/149,964, 12/073,095, 12/073,889, 12/007,076, 12/003,691, 12/003,809, 11/806,711, 11/806,285, 11/806,284, 11/566,322, 11/527,628, 11/527,629, 11/498,874, 12/545,992, 12/806,711, 12/806,285, 12/806,284, 12/566,322, 12/527,628, 12/527,629, 12/527,631, 12/502,661, 11/498,881, 11/255,981, 11/184,771, 11/152,063, 11/094,215, 11/092,742, 11/092,741, 11/094,156. 11/094,155. 10/954,189, 10/902,123, 10/883,719, 10/883,747, 10/341,519, 12/545,992, 12/292,580, and in particular to U.S. patent application Ser. Nos. ("LED power failure Light"); ("LED light device has special effects"); "(LED light device has more than 1 reflective means for plurality of image"); 12/624,621 ("project device or assembly for variety of LED light"); 12/622,000 ("Interchangeable Universal Kits for all LED light"); 12/318,471 ("LED night light with pinhole imaging"); 12/318,470 ("LED night light with Projection features"); 12/318,473 ("LED night light with laser or hologram element"); 12/292,153 ("LED night light with Projection or imaging features"); 12/232,505 ("LED night light with Projection features"); 12/149,963 ("Removable LED light device"); 12/149,964 ("Surface Mounted Device with LED light"); 12/073,095 ("LED Track light device"); 12/073,889 ("LED light with changeable position with Preferable power source"); 12/007,076 ("LED light with changeable geometric system"); 12/003,691 ("LED light with changeable geometric dimension features"); 12/003,809 ("LED light with changeable features"); 11/806,711 ("Multiple LED light with adjustable angle features"); 11/806,285 ("LED Night light with outlet device"); 11/806,284 ("LED Night light with more than 1 optics means"); 11/527,628 ("Multiple function Night light with air freshener"); 11/527,629 ("LED Night light with interchangeable display unit"); 11/498,874 ("Area illumination Night light"); 11/527,631 ("LED Time piece night light"); 12/545,992 ("LED time piece Night light"); 12/292,580 ("LED Time Piece Night light"); 11/498,881 ("Poly Night light"); 11/255,981 ("Multiple light source Night Light"); 11/184,771 ("Light Device with EL elements"); 11/152,063 ("Outlet adaptor with EL"); 11/094,215 "(LED night light with liquid medium"); 11/094,215 ("LED Night light with Liquid optics medium") 11/092,741 ("Night light with fiber optics"); and 10/883,747 ("Fiber Optic light kits for footwear").

The above-listed applications apply physics and optics theory to a night light arranged to be supplied with electrical power from an electrical outlet; battery; or a solar or other power source to create a plurality of LED light images on a surface the night light preferably having more than one light source, more than one function, and/or more than 1 optics means.

BACKGROUND OF THE INVENTION

The current invention utilizes a concept initially disclosed by the Inventor in his U.S. Pat. No. 6,179,431, filed Dec. 24, 1998. The difference between the invention described in the '431 patent and the current invention has to do with the use of a light emitting diode (LED) instead of an electro-luminescent element as the light source(s) of an emergency power failure night light, which operates on battery power when the supply of electricity to an electrical outlet is cut off during a power failure.

Also, a major difference between the LED night light of the invention and other conventional LED power failure night lights lies in power saving and management, eliminating the need to use relatively expensive and low-powered rechargeable batteries. All other prior art arrangements have preferred to use rechargeable batteries as the power source for the emergency light, which is very bad for at the reasons that:

(A) The capacity of the rechargeable battery normally is much less than that of a non-rechargeable battery. For example, a AAA size rechargeable battery only has a 650 ma capacity, while and the capacity of the non-rechargeable battery can be 1,000 ma to 1,200 ma for a Duracell brand battery, which is the most common battery used in North America. (B) Not only is there a big difference in the capacities of rechargeable and non-rechargeable batteries, but also in the potential risk for fire, which is larger for a rechargeable battery. It is common to hear that a cellular phone or flip top computer rechargeable battery has exploded, so it is dangerous to use a rechargeable battery for the power failure night light because, since the power failure night light is normally plugged into a wall outlet, if the inner rechargeable battery explodes, a big house fire can result, which might burn down the entire house or damage the electrical system, which might cost millions of dollars to repair. If any people are injured or die, the maker or seller will be held strictly liable.

(C) To use a rechargeable battery as a power source for an emergency light incurs extra cost for the recharge circuit, and necessitates more safety electric components such as surge protection and high voltage impact protection to enable the circuit to survive a lightning strike on the house electric system, greatly increasing the overall cost of the rechargeable battery arrangement.

(D) Still further, the rechargeable battery normally has a "memory" problem. If people do not initially plug-in the rechargeable battery device for at least 12 or more hours, the battery may only charge to ¼, ⅓, ½, ¾, or ⅔ of battery capacity (for example, 650 ma for a AAA battery, the battery can only be charged to 650/4, 650/3, 650/2, 650×¾, 650×⅔). No rechargeable battery has a 100% fully rechargeable quality.

(E) The rechargeable battery degrades. Normally, the rechargeable battery can only be charged for a limited number of cycles and some batteries will degrade so quickly to degrading and that they can only be recharged 10, 50, or 100 times depending on which company makes the batteries.

Disadvantages (A), (B), (C), (D), (E) of rechargeable batteries are exacerbated because all current market power failure light use especially cheap China-made cheap rechargeable batteries without any well-known company to strictly test and endorse batteries. It is too big a risk to rely on such rechargeable batteries when they are needed during a power failure.

The current invention not only solves the most fatal concerns for rechargeable batteries as described above, but also optionally incorporates many of the advantageous features described in the above-cited applications and patents of the inventor, including provision of more than one light source, more than one function, more than one optics means, interchangeable power sources, a projection light, an LED light with special functions, and more than one reflective means.

According to the persistence of vision theory, the human eye has a response time within 1/24 (41.67 msec) to 1/16 (0.0625 sec) second, when an object moves faster than the human eye response time, the last image stays in the human eye and brain for a period of time. This theory can be applied to an LED or LEDs because an LED's or LEDs' response time is very short (around 10 msec or less). Hence, if more than 16-24 pictures per second appear in front of the human eye, than people will think all pictures are continuous. The current invention uses a related circuit, control means, IC, micro controller to make the LED or LEDs blink much faster than 16-24 times (cycles) per second with each cycle consisting of 10% turn-on and 90% for turn-off to thereby save 90% of the power consumption and increase battery life by nine times relative to a full steady-ON condition. This is a substantial power saving for all battery power source applications. It will be appreciated that new LED technology may coming soon to provide the LED with a quicker response time of less than 10 msec, and perhaps a 5 msec time or 2 msec to provide even more power saving. To adjust the duration time of each cycle for turn-on and turn-off will provide more power saving devices to meet the green world concept. This is the other very important concept of the current invention.

Further cost saving of a battery powered unit by using batteries which have a voltage that is lower than trigger voltage of the LED or LEDs and use a circuit with proper electric components, parts, and accessories to raise up the battery's lower voltage to a higher voltage to trigger the LED or LEDs. This can reduce the quantity of required batteries and further lower the cost of the battery operated LED light unit.

The above advantages may be achieved by providing the following combination of features:

An LED power failure device including:
at least one first LED element(s) that serves as a night light to offer illumination when its power source supplies an electric signal to the device from a preferred combination of power source and circuit means, switch means, sensor means, control means, and/or conductive means, the power source being connected by a USB adaptor or prong means;
at least one second LED element(s) that serves as an emergency light to offer illumination when the power source for the first LED or LEDs element(s) fails to supply an electric signal to the night light
wherein the second LED element(s) offer illumination from the battery power source when the first LED or LEDs element(s) power source fails to supply the electric signal to the device, the battery power source having a compartment that enables the battery or batteries to be easily replaced and installed, the battery being a non-rechargeable type,
the first LED element(s) and second LED element(s) having a desired number of pieces to offer sufficient light output and brightness for illumination and both element(s) being connected with a preferred combination of electric parts and accessories, switches, sensors, control means, diode(s), mechanical means, conductive means, an Integrated Circuit (IC), microcontroller, flip prong means, and USB connector to cause the night light and the emergency light to turn on and turn off according to a pre-determined function, time, brightness, color, timing, and/or direction.

The LED power failure device may have more than one optics means Ser. No. 11/806,284, with the first LED elements being incorporated with an optics medium to cause the LED(s) to provide uniform area illumination when acting as a night light.

The LED power failure device may also have multiple light sources as described in the above-cited U.S. patent application Ser. No. 11/255,981, the first and second LED elements being arranged in a matrix to face at least one or multiple directions, or to have different positions, orientations, or locations to be seen by viewers, with some LED or LEDs acting as a night light and some acting as an emergency light.

The LED power failure device may also have multiple light sources such that the first and second LED light elements have LEDs that face in more than one direction, location, position, or orientation to offer multiple areas for illumination as described in U.S. patent application Ser. No. 11/255,981.

The LED power failure device may include first and second LED elements and at least one optics means selected from an optics lens, convex lens, concave lens, diffusion lens, curved lens, adjustable focus means, rotating or adjustable angle means, windows, openings, cutouts, or a reflector, to change optical properties of light beams emitted by the LED elements by, for example, magnifying a hot spot to provide wider area illumination, concentrating all LEDs light beams in a super bright spot, or creating other optical effects.

The LED power failure device may further include a mechanical or electric switch having at least one function selected from the following functions: on, off, auto, timer, time delay, flashing, partial on, partial off, partial flash, partial chasing, partial random, partial fade-in and fade-out, varied duration ON and OFF for the blinking function, power saving selection, blinking function selection, persistence of vision effects, blinking of an LED or LEDs, on and off percentage of each blinking cycle, power saving setting or selection, LED or LEDs group reset selection, or any LED light functions for a plurality of LEDs that are available from the market place.

The LED power failure device include first and second LED elements that, as disclosed in U.S. patent application Ser. No. 11/806,285, can be any type of LED with single color or multiple colors, including LEDs that change color, number of LEDs for illumination, and/or light functions by control, switch, or sensor means.

The LED power failure device may also be a multiple function LED light as disclosed in U.S. patent Ser. No. 11/806,285, in which the ordinary LED lighting functions are combined with other functions selected from the group of additional functions including functions of an electrical outlet, air freshener, motion sensor, beacon light, warning light, chasing lights, flash light, bug repelled device, mosquito repellant device, mouse repellant device, sonic repellant device, projection device, persistence of vision device, blinking LED device with or without different on and off percentages for each blinking cycle, power saving setting or selection devices, and devices with LED group reset selection for extra functions on the device.

The LED power failure device may also include multiple light sources as disclosed in U.S. patent application Ser. No. 11/255,981, the device having another LED or LEDs for indicating the battery status, including low battery capacity, full capacity, or half capacity with preferred colors to indicate the status of batteries, or show that the device is on duty status.

The LED power failure device may further include special effects, in which first and second LED element(s) are controlled by a control means to flash or blink at a rate that faster than a human's eye response time of $1/24$ to $1/16$ second to take advantage of the inertia of a human eye, the blinking speed meeting the requirement of persistence of vision to let the people see a continuous light beam from the LED element(s) to save power consumption of the batteries.

The LED power failure device may also have a blinking frequency that is faster than the human eye's scan speed, which is within $1/48$ second, for a frequency of at least 48 Hz.

The LED power failure device may have a battery voltage that is higher than the LED trigger voltage, or a battery voltage that is lower than the LED trigger voltage while incorporating a voltage raise-up electric circuit to raise the battery voltage up to the LED trigger voltage.

The power saving features of the LED light device thus may be achieved by control means that cause the LED or LEDs to turn-on and turn-off for a certain percentage of each cycle take advantage of the persistence of vision of the human eye by turning off for less than 1/24 to 1/16 second to cause people to perceive the blinking LED or LEDs as being continuously on.

DETAILED DESCRIPTION OF THE PREFERRED EMBODIMENTS

The current invention relates to an LED light device having a built-in night light and emergency light in one device. The night light is powered by the wall outlet power source and the emergency light is powered by non-rechargeable batteries. The light device may incorporate more than one LED, more than one function, more than one optics means, more than one reflective means, persistence of vision effects, projection means, motion sensor means, adjustable angle means, adjustable focus means, adjustable color means, adjustable brightness means, adjustable blinking speed means, adjustable power consumption means, air freshener means, and other market available electric or mechanical extra functions to provide a very practical LED light device.

Figure 1:
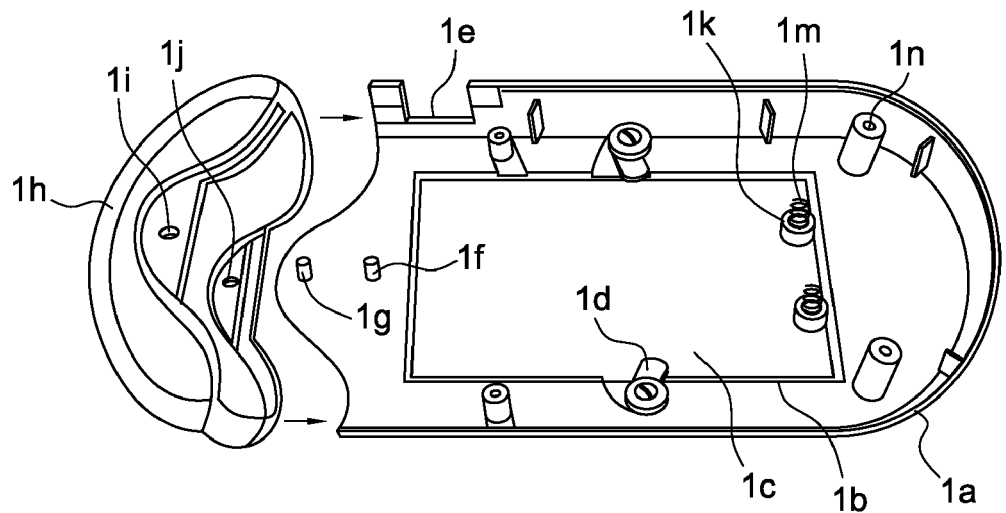
FIG. 1 illustrates a first preferred embodiment of the invention, including first LED element(s) with optic means to make the LED or LEDs provide even illumination to act as a night light.

FIG. 1 shows the inner construction of the first preferred embodiment, including one opening or window (1b) to install optics means underneath and a first LED element(s) inside to provide a very even light that is spread out for area light performance. This is similar to the arrangement disclosed in U.S. patent application Ser. No. 11/498,874. The first LED element(s) has electrode(s) connected by resilient conductive means (1m) to deliver an electric signal from circuit means to the first LED element(s). The optics medium is positioned under a cover (1c) and fixed by two flanges (1d). The inner side of the cover has a plurality of poles (1n) to enable the cover and lower housing to be fastened together. The cover has an opening or cut-out (1e) to install a switch means (not shown) selecting respective functions of the first and also second LED element(s). One optic means (1h) has a variable wall thickness to provide preferred optics properties such as enlarging the LED image, concentrating the LED light beam to a tiny spot, or focusing all light beams into a spot to cause the inner LED or LEDs exhibit a desired light performance.

Figure 2:
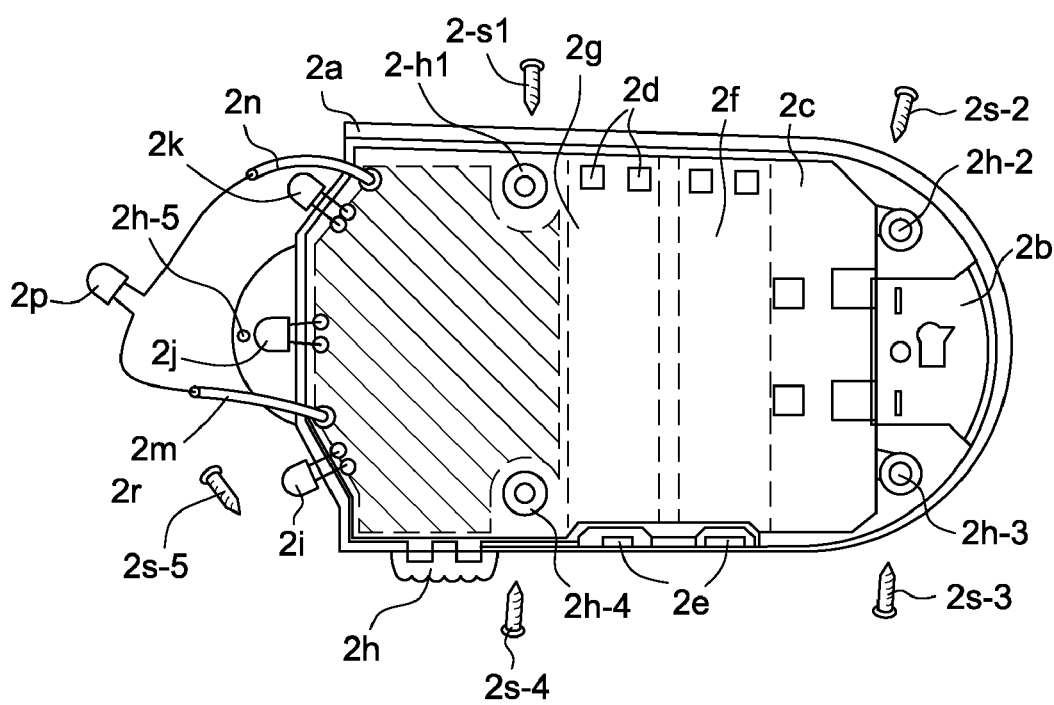
FIG. 2 shows a preferred construction for the inner side of the first embodiment, in which the LED or LEDs are connected with a circuit board having battery indicator light and battery terminal connections as well as flip-able prong means.

FIG. 2 illustrates the construction of a lower housing (2a) of the first preferred embodiment, which is shaped to allow a circuit board (2c) to fit within. The circuit board (2c) is divided into three areas to provide three major functions. One area has electric components to change an alternating current (AC) input into an LED trigger current. The other area has electric components to allow batteries to be connected to the second LED element(s) when the power source fails to supply electric signals to the first LED element(s). The final area has electric components to allow the second LED element(s) to have a desired light function, a desired number of LEDs to turn on and off, selection of a power consumption saving level, or causing the LED element(s) to blink rapidly to save up 99% electricity according to the persistence of vision method described in a copending U.S. patent application filed on Feb. 25, 2010, or any or the other functions described above.

As shown in FIG. 2, the lower housing has screw poles (2-h1) (2h-2) (h-3) (2h-4) to fasten the cover by screws (2-s1) (2s-2)(2s-3)(2s-4) and also to fasten the circuit board (2c) together. The circuit board (2c) has LED element(s) (2i)(2j) (2k) that make up the second LED element(s) to provide an emergency light. The other LED (2p) is an extra LED that is connected with conductive means (2m)(2n) fixed on the circuit board (2c) to show the battery status, for example by using a green color for full capacity of the batteries, an amber color for half capacity of the batteries, and a red color for low of capacity of the batteries. The circuit board (2c) also has areas to install the batteries between contact means including positive contact-piece (2d) and negative contact-spring (2f), so that the batteries can deliver electricity to the circuit board to supply electric power to the second LED element(s) for emergency light application. The batteries of the preferred embodiment are non-rechargeable so the circuit board does not need expensive charging related electric designs. The circuit board also has electric contact areas (2b1) (2b2) that allow the flipable prong means (2b) or a fixed prong means to supply AC power to the circuit board. The lower housing also has a hole (2h-5) to allow a screw (2s-5) to pass through the hole (2h-5) and be fastened to a top lens (1h) having a hole (1j) to solidly fasten the top lens on the lower housing (2c) and cover (1a).

Figure 3:
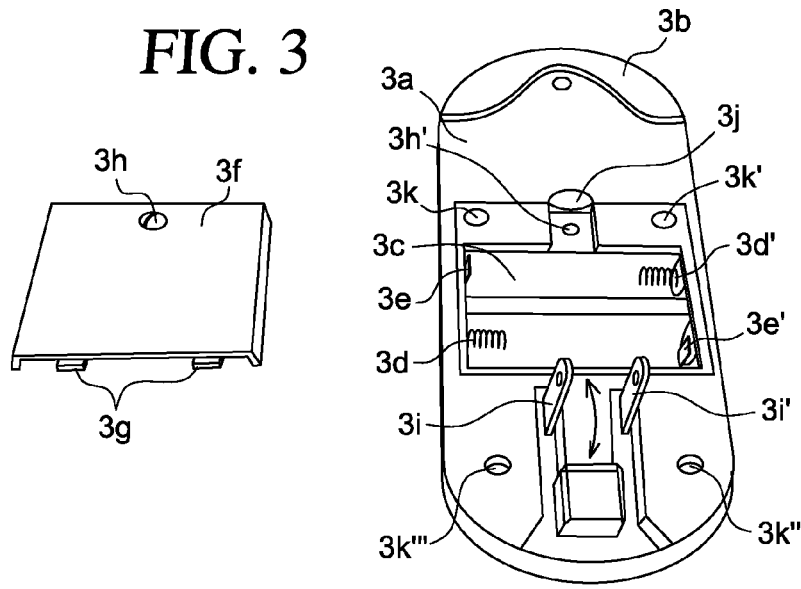
FIG. 3 shows a back housing exterior design for the first preferred embodiment, with a battery compartment to enable simple battery replacement and a front optics lens for emergency lighting with a safety screw for the battery cover and flippable prong means.

FIG. 3 is a back side view of the preferred embodiment of FIGS. 1 and 2. The back view shows a front lens (3b) fastened with the lower housing (3a) by screws (not shown). The lower housing (3a) has one battery compartment (3c) with a negative battery contact-spring (3d)(3d') and positive metal contacts (3e) (3e') so that the batteries can make a good electric connection with the positive metal contacts and contact-spring to supply electric current to the circuit board. The battery compartment (3c) of the illustrated embodiment only has space for two batteries with a total voltage of only 3.0 volt, which is not enough to trigger blue or white color LEDs that need a higher voltage. Normally, a battery compartment has space for three batteries to obtain an approximately 4.5 Volt battery voltage. The current invention reduces the space to a two battery space to provide a super compact hand-held device. In order to provide enough voltage to trigger the LED(s), a simple voltage-boosting circuit is provided. The voltage-boosting circuit may be a conventional circuit that includes a choke, or equivalent voltage-raising electric component(s) to raise the voltage of a single piece battery from 1.5 volts to 4.5 volts or of two batteries from 3.0 volts to the 4.4 volt LED trigger voltage. Furthermore, in order to provide super power saving for the first and second LED element(s), persistence of vision theory can be used to cause the LED or LEDs to blink instead of being continuously on, which can save up to 99% of electric power consumption. In order to make a continuous image of the LED or LEDs, the blinking speed needs to be faster than the human eye's response time, which is between 1/24 to 1/16 second. As long as the LED or LEDs blink at a speed that is much faster than 1/24 to 1/16 second, people will think that the LED or LEDs are continuously ON even though they are actually on-off blinking. In order to provide real power saving, it is suggested to provide a blinking duty cycle that is 1 to 10% ON and 99 to 90% OFF for each cycle, which not only provides substantial power savings but also extends the illumination time up to 99 times compared to an LED that is non-blinking and 100% ON.

As shown in FIG. 3 the lower housing (3a) has prong means (3i)(3i') which can be rotated 90 degrees for insertion into a wall outlet or extended to 180 degrees. The lower housing (3a) is fastened to the cover by screws (not shown) through the screw holes (3k) (3k')(3k"0(3k'''). The battery compartment (3c) has it own cover (3f) assembled to the lower housing 3(a) by two catches (3g) and screws (not shown) extending through holes (3h) to prevent safety hazards to children.

Figure 4:
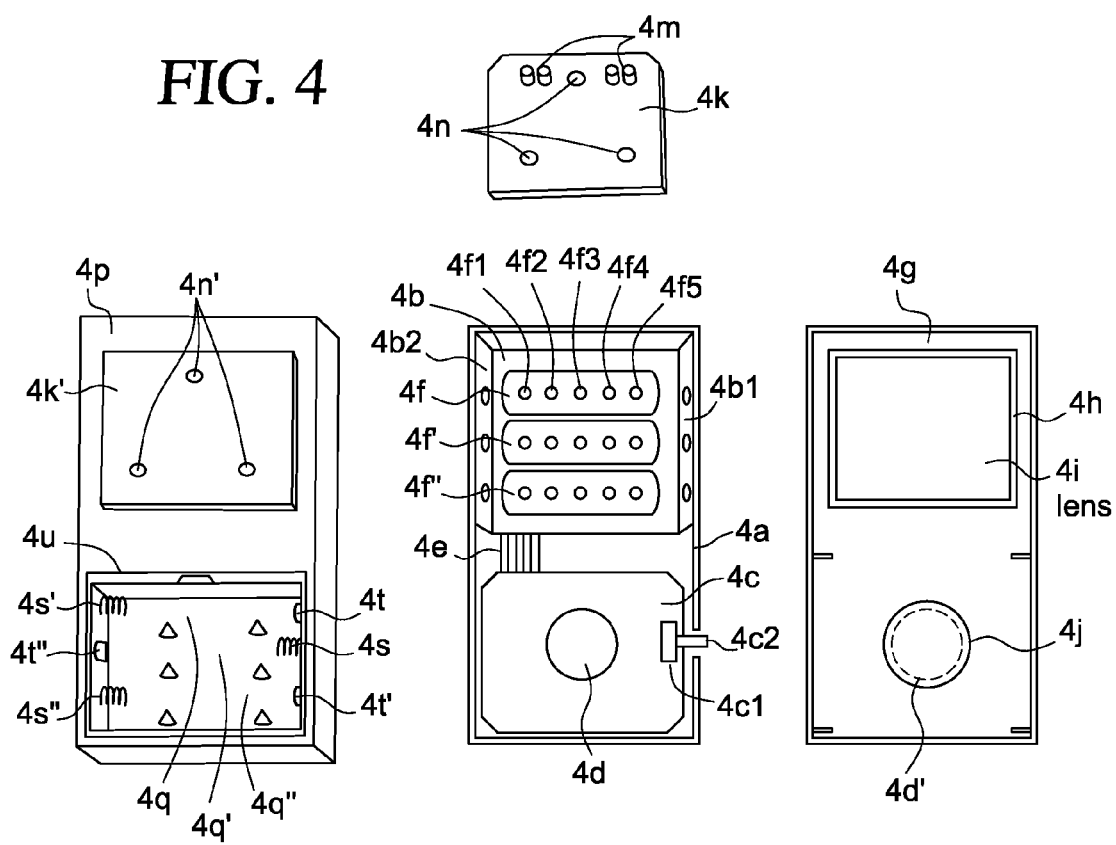
FIG. 4 a second preferred embodiment having first and second LED element(s), a circuit PCB, conductive means, the number and arrangement of the LED or LEDs being selected to provide a night light and emergency light with a color selective switch, motion sensor, function switch, and optics lens construction.

FIG. 4 illustrates a second preferred embodiment which has a lower housing (4a) that includes first and second LED element(s) on a reflective tray (4b). A plurality of LEDs for this preferred embodiment includes five LEDs per row times three rows, which equals 15 LEDs on a center portion and three LEDS×2 sides equaling 6 LEDs on the two sides, for a total of 21 LEDs. It is preferred that five center LEDs be used for night light application and that the rest of the 16 LEDs be used for the emergency light application.

Alternatively, different numbers of LEDs can also be used for the first and second LED element(s), such as four LEDs for the night light and six LEDs for a first emergency light 1 and the rest of the 11 LEDs for second emergency light 2. This can be easily accomplished by providing an appropriate circuit or switch arrangement to obtain a desired arrangement, selection, and/or functions of the LEDs. The LED light device of this embodiment also can have a switch to select different light performances from any combination of blinking LEDs, on and off percentages of each blinking cycle, power saving setting or selections, or LED group reset selections, which can all easily be implemented by combining the switch with an appropriate circuit, IC, or micro controller available from the conventional market.

As shown in FIG. 4, The LED or LEDs can face not only in one direction but be situated at different locations in different orientations to meet market requirements. For example, the LED and LEDs on the reflective tray (4b) have two sides (4b1) (4b2) where the reflective surface is tilted against the front surface (4b) so the LED or LEDs can be seen from the side of the lower housing (4a). One of the circuit boards (4c) fits into the lower housing (4a) and has a multiple section switch (4c-1) with an arm (4c2) extending to outside of the lower housing to enable people to selection a variety of functions including the number of LEDs respectively used for the night light or emergency light, power saving modes of operation for the night light or emergency light, blinking for the night light or emergency light, color changing for the night light or emergency light, on/off percentages for each cycle of the night light or emergency light, reset of the LED number for night light or emergency light, and/or other function selection, photo sensor selection, motion sensor selection, as well as selection from steady/chasing/random/fade-in and fade out/and group sequencing by multiple sections.

As shown in FIG. 4, the back of the housing (4p) has one surface mounting board (4k''') which can slide into the lower housing (4p), the mounting board (4k''') having three screw holes (4n') to allow people to fix the mounting board (4k''') on any surface and while enabling the housing (4p) to slide in and out as required to replace batteries.

As shown in FIG. 4, the LED light device includes one battery compartment having positive metal contacts (4t)(4t') (4t'') and negative contact-springs (4s) (4s') (4s'') to receive three batteries in the compartment and provide a sufficient working voltage to trigger the LEDs for desired illumination according to predetermined functions selected or controlled by switch means, sensor means, control means and circuit means.

As shown in FIG. 4, the front cover (4g) has one lens (4i) fits within the front cover's window (4h), which can offer certain optics properties for inner LED or LEDs. For example, the front cover (4g) may have one hole (4j) to install a Fresnel lens and allow an inner motion sensor to detect any motion and movement in front of the sensor, driving the inner LEDs to provide desired illumination under pre-determined functions.

Figure 5:
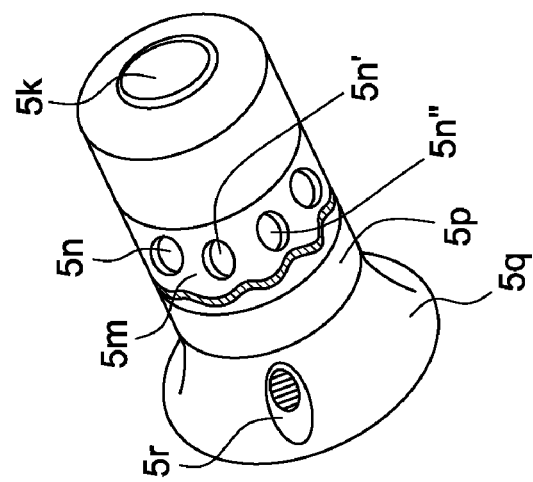
FIG. 5 shows a third preferred embodiment in the form of a motion sensor night light with a projection light assembly, focus adjustable means, emergency light on the bottom, film/display change means, function selection switch, and battery compartment cover which has extra functions in addition to those of a night light and emergency light.
Figure 5:
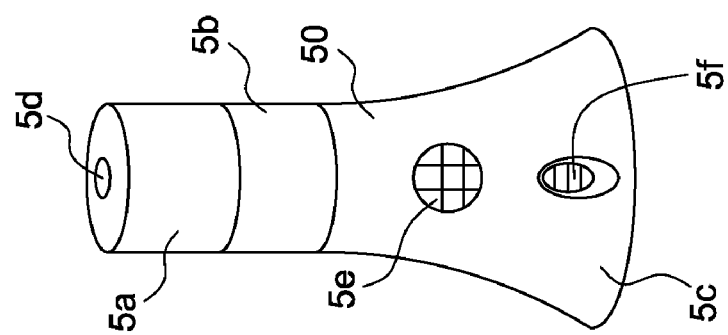
Figure 5:
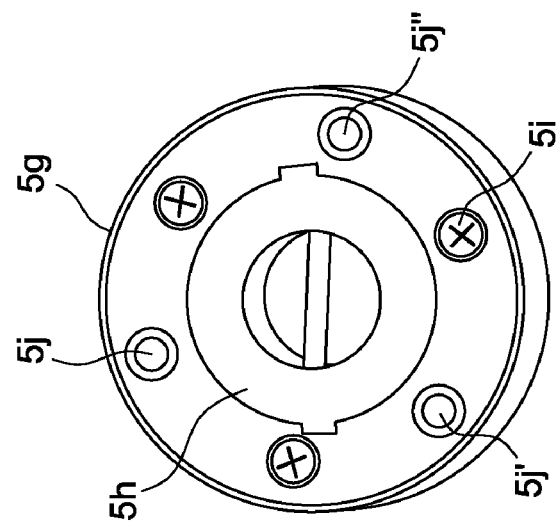

As shown in FIG. 5, the multiple function power failure light has at least (1) a projection function; (2) a night light function; (3) an adjustable focus function; (4) a changeable display function; (5) emergency light function; (6) a p/blinking function; (7) adjustable on/duration percentage functions for groups of first or second LEDs; and/or number or color selection functions for the first or second LEDs, as discussed above.

Also as shown in FIG. 5, the device has an adjustable focus inner display changing means (5m), a projection light (5d) on a head portion (5a), a waist portion for the night light (5b), a bottom portion for an inner power source, an emergency light (5j)(5j') (5j'''), switch means (5f), sensor means (5c), and inner circuit means. As a result, the LED power failure light is not limited only to a night light and emergency light, but can add other extra functions on top of the basic night light and emergency light functions.

Figure 6:
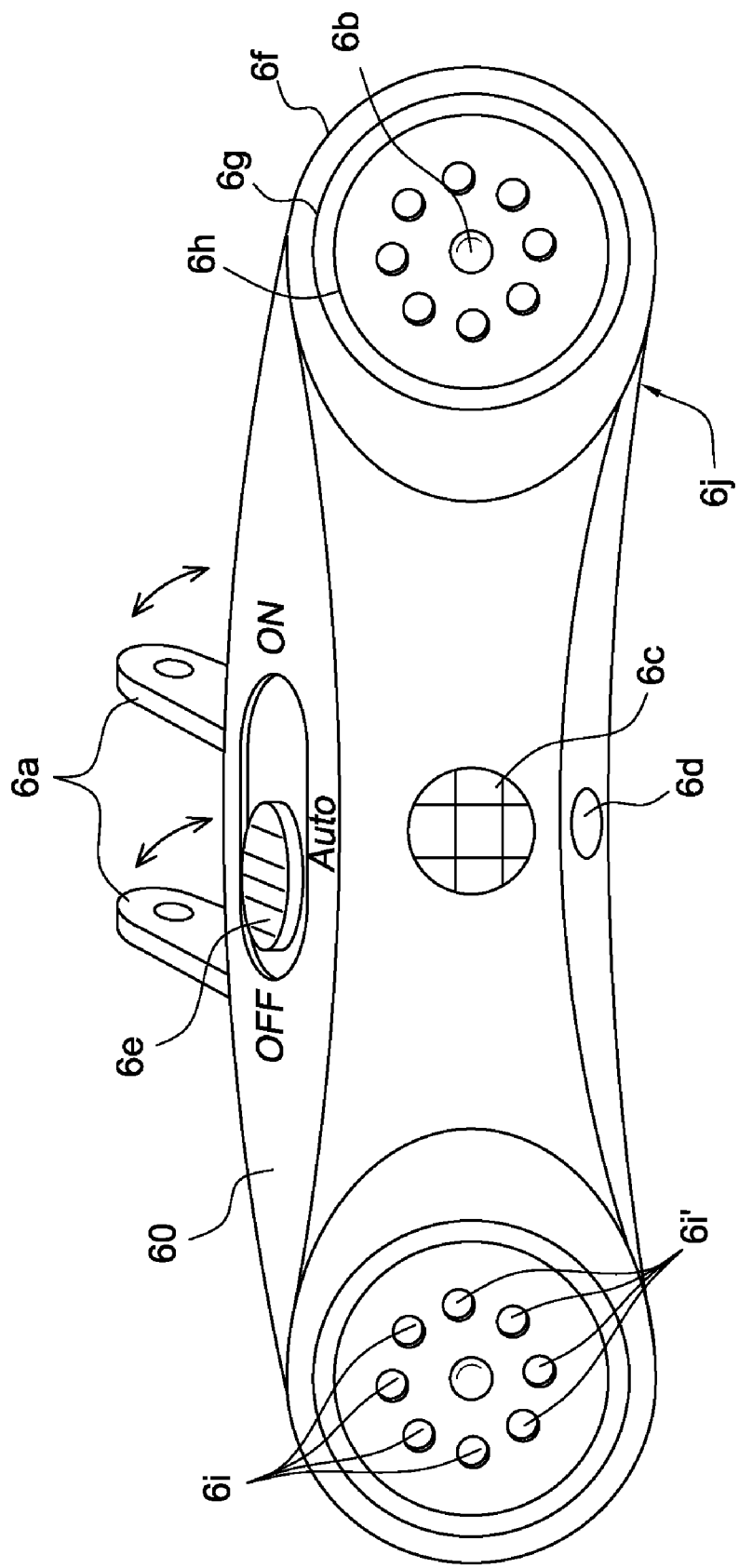
FIG. 6 shows a fourth preferred embodiment in which the angle, position, direction, orientation of first and second LED element(s) of the night light and emergency light are adjustable, and which includes a motion sensor, color changing switch, function selection switch.

As shown in FIG. 6, the third embodiment of the LED power failure light device has a two section (right and left) light arrangement to cover a wider range than the normal single section LED arrangement. The right and left sides have two ends with the two sections of the LED arrangement. The right side has end (6f) which has an angle adjustable LED unit (6g) that can be rotated 360 degrees and a tilt part (6h) that can be tilted to a desired angle. Each tilt part has one LED (6b) that makes up the first LED element(s) that serve as a night light and that is surrounded by eight LEDs (6i) (6i') for $2^{nd}$ LED or LEDs element(s) that serve as an emergency light. The power failure light has prong means (6a) to connected to an electrical outlet power source and a multiple selection manual switch (6e). motion sensor (6c), and push button switch for changing colors (6d). The emergency power source that is in addition to the prongs may include batteries. The main night light power source may optionally include a USB adaptor, or other power sources available from the marketplace.

Figure 7:
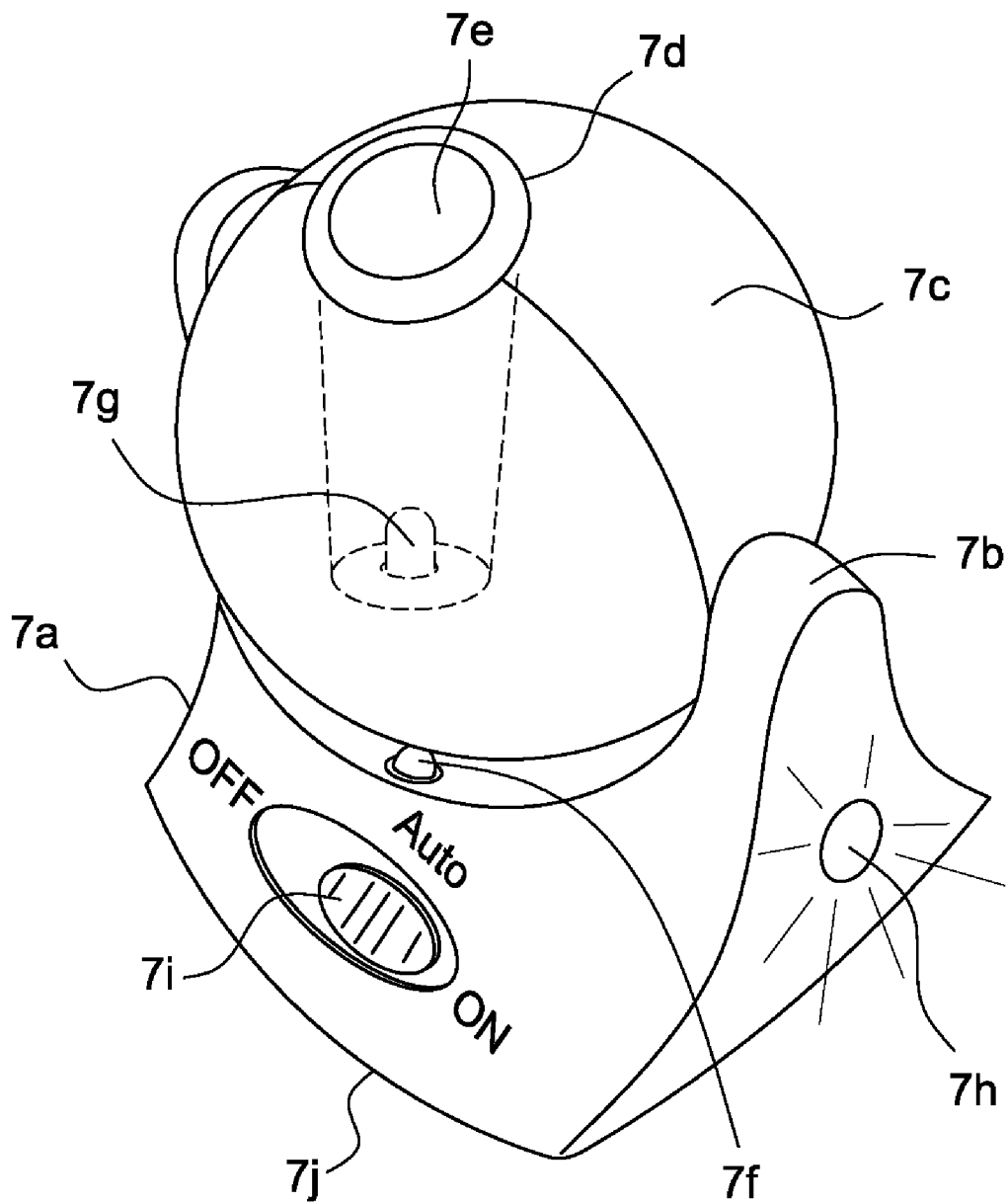
FIG. 7 shows a fifth preferred embodiment that includes a projection light, glow ball night light, side emergency light, and multiple selection switch to control the projection light, night light and emergency light.

FIG. 7 shows an LED power failure light device which has a projection function implemented by a projection head (7e) installed on a ball shade hole (7d) having one LED (7g) inside the ball shade (7c). The ball shade (7c) is illuminated from below by an LED (7f) that acts as a first LED element(s) for the night light application of the current invention. Additional LEDs (7h) are located at body of the base (7h) to offer super bright illumination when a power failure occurs. Power for the first LEDs may optionally be supplied from a USB power source. The switch (7i), batteries (7J), and switch means (7i) are at a preferred position and location.

Having thus described various preferred embodiments of the current invention it is to be appreciated that devices having alternative, equivalent, or same functions, and that have equivalent arrangements or construction may still fall within the scope of the invention.

The invention claimed is:

1. A power failure device, comprising:
a power source means for connecting the power failure device to a power source, said power source means selected from the group consisting of prong means extending from the power failure device and arranged to be inserted into prong-receiving openings in an electric outlet and USB adapter means extending from the power failure device and arranged to be inserted into a USB adapter-receiving opening in a USB power outlet;
at least one first LED element arranged to serve as a night light and provide illumination when a power source supplies the at least one first LED element with an electric signal, the at least one first LED element being connected to the power source by circuitry including electrical components selected from at least one switch, sensor, and/or controller;
at least one battery;
at least one second LED element arranged to serve as an emergency light and supplied with power by the at least one battery when said power source fails to supply said electric signal to said at least one first LED element, the at least one second LED being connected to the battery by circuitry including electrical components selected from at least one switch, sensor, and/or controller,
wherein respective said circuitry including electrical components from at least one switch, sensor, and/or controller being arranged to selectively cause said night light and said emergency light to turn on and off according to predetermined functions, timing, brightness, color, duration, and direction, and
wherein:
said battery is a non-rechargeable battery arranged to be positioned in a compartment of the device,
said prong means extends from said LED power failure device for direct insertion into the corresponding electric outlet or said USB adapter means extends from said LED power failure device for direct insertion into the corresponding USB power outlet, and
said at least one second LED element being a flashing means for saving power by flashing so rapidly that the at least one second LED element appears to be continuously on and the flashing cannot be detected by an observer, wherein said at least one second LED element is arranged to flash such that said at least one second LED element is turned-off for a predetermined percentage of each turn on/turn off cycle, said percentage being selected such that the frequency of the flashes is shorter than an eye's reaction time causing a persistence of vision effect, wherein power savings is achieved because the at least one second LED is turned-off for predetermined periods of time even though the at least one second LED element appears to be continuously on due to the persistence of vision effect.

2. An LED power failure device as claimed in claim 1, wherein the at least one first LED element incorporates an optics means for causing light beams emitted by an LED to spread out and provide even illumination for area lighting.

3. An LED power failure device as claimed in claim 1, wherein the first and/or second LED elements are arranged at different positions to face different directions or have different orientations.

4. An LED power failure device as claimed in claim 3, wherein the first and/or second LED elements are arranged in different groups that face said different directions or have different orientations.

5. An LED power failure device as claimed in claim 1, further comprising at least one optics means changing light beams emitted by the first and/or second LED elements, said optics means selected from the group consisting of an optics lens, a convex lens, a concave lens, a diffusion lens, a curved lens, and adjustable focus means, a rotating or angle-adjustment means, windows, openings, cutouts, and reflectors to magnify a hot spot and provide wider area illumination, concentrate LED light beams in a single bright spot, or achieve other optical effects.

6. An LED power failure device as claimed in claim 1, wherein said switch is a mechanical or electric switch having functions selected from the group consisting of the following functions: on, off, auto, timer, time delay, flashing, partial on, partial off, partial flash, partial changing, partial random flashing, partial fade-in and fade-out, on/off duty cycle variation, persistence of vision effects, power saving settings or selection, and LED group reset selection.

7. An LED power failure device as claimed in claim 1, wherein the first and second LED elements are selected from the group consisting of single and multiple color LEDs of any specification, and in which the color, number, and functions of the LEDs are predetermined or controlled by said switch, sensor, and controller.

8. An LED power failure device as claimed in claim 1, wherein said power failure device includes additional functions selected from the group consisting of functions of an air freshener, motion sensor, beacon light, warning light, chasing lights, flash light, bug mosquito or mouse repellent device, sonic repellent device, and projection device.

9. An LED power failure device as claimed in claim 1, further comprising an LED for indicating a battery status selected from the group consisting of a low battery capacity, a full battery capacity, and a half battery capacity.

10. An LED power failure device as claimed in claim 1, wherein said turn-off or persistence of vision flashing cycle is faster than a human eye's response time of $1/24$ to $1/16$ second.

11. An LED power failure device as claimed in claim 1, wherein a frequency of said flashes exceed a human eye's scan speed of $1/48$ Hz.

12. An LED power failure device as claimed in claim 1, wherein said battery has a voltage that is higher than an LED trigger voltage.

13. An LED power failure device as claimed in claim 1, wherein said battery or a combination of batteries including said battery has a voltage lower than the LED trigger voltage and said circuitry includes a voltage boosting circuit or component to raise the voltage up to the battery trigger voltage.

14. An LED power failure device having power saving features, comprising:

at least one LED to serve as a light source;

at least one housing having space to install circuitry including conductors and electric components selected from the group consisting of switches, sensors, integrated circuits, and micro controllers, said circuitry supplying power to the at least one LED to cause the at least one LED to turn on and off according to predetermined functions, effects, on/off timing or percentages, color, and/or brightness, the power saving features including the at least one LED being arranged to turn on and off for predetermined percentages of each turn on/turn off cycle, said percentages being selected such that the frequency of the cycle is shorter than an eye's 1/24 second to 1/16 second reaction time causing a persistence of vision effect so that the at least one LED appears to be continuously on and the resulting flashing is not visible to an observer, wherein power savings is achieved because the at least one LED is turned-off for predetermined periods of time even though the at least one LED appears to be continuously on due to the persistence of vision effect.

15. An LED power failure device having cost saving features, comprising:

at least one LED to serve as a light source;

at least one housing having space to install at least one battery and circuitry including conductors and electric components selected from the group consisting of switches, sensors, integrated circuits, and micro controllers, said circuitry supplying power from the battery to the at least one LED to cause the at least one LED to turn on and off according to predetermined functions, effects, on/off timing or percentages, color, and/or brightness, wherein said battery or a combination of batteries including said battery has a voltage lower than the LED trigger voltage and said circuitry includes a voltage boosting circuit or component to raise the voltage up to the battery trigger voltage.

\* \* \* \* \*